United States Patent
Thompson et al.

(10) Patent No.: US 7,632,043 B2
(45) Date of Patent: Dec. 15, 2009

(54) SEISMIC SENSOR TRANSFER DEVICE

(75) Inventors: James N. Thompson, Sugar Land, TX (US); Reagan N. Woodard, Jr., Sugar Land, TX (US); Clifford H. Ray, Fulshear, TX (US)

(73) Assignee: Fairfield Industries Incorporated, Sugal Land, TX (US)

( * ) Notice: Subject to any disclaimer, the term of this patent is extended or adjusted under 35 U.S.C. 154(b) by 103 days.

(21) Appl. No.: 11/843,965

(22) Filed: Aug. 23, 2007

(65) Prior Publication Data

US 2009/0052992 A1  Feb. 26, 2009

(51) Int. Cl.
*G01V 1/09* (2006.01)
*B63C 11/52* (2006.01)

(52) U.S. Cl. .......................... 405/190; 181/110; 367/15
(58) Field of Classification Search .................. 405/158, 405/161, 166, 169, 188–191; 367/14, 15; 114/364; 181/110–112
See application file for complete search history.

(56) References Cited

U.S. PATENT DOCUMENTS

| | | | |
|---|---|---|---|
| 4,905,404 A | 3/1990 | Pasion et al. | |
| 5,253,223 A | 10/1993 | Svenning et al. | |
| 5,271,953 A | 12/1993 | Litteral | |
| 5,442,590 A | 8/1995 | Svenning et al. | |
| 5,811,055 A | 9/1998 | Geiger | |
| 6,350,085 B1 * | 2/2002 | Bath et al. .................. | 405/166 |
| 6,456,565 B1 | 9/2002 | Grall et al. | |
| 6,474,254 B1 | 11/2002 | Ambs et al. | |
| 6,588,980 B2 | 7/2003 | Worman et al. | |
| 6,612,397 B2 | 9/2003 | Sparrevik et al. | |
| 6,625,083 B2 | 9/2003 | Vandenbroucke | |
| 6,657,921 B1 | 12/2003 | Ambs | |
| 6,975,560 B2 | 12/2005 | Berg et al. | |
| 7,210,556 B2 | 5/2007 | Bath et al | |
| 7,254,093 B2 | 8/2007 | Ray et al. | |
| 2001/0028041 A1 | 10/2001 | Hubbard | |
| 2002/0172562 A1 * | 11/2002 | Worman et al. ............. | 405/161 |
| 2003/0218937 A1 | 11/2003 | Berg et al. | |
| 2005/0052951 A1 | 3/2005 | Ray et al. | |
| 2005/0276665 A1 | 12/2005 | Entralgo et al. | |
| 2006/0120216 A1 | 6/2006 | Ray et al. | |
| 2006/0159524 A1 | 7/2006 | Thompson et al. | |
| 2006/0243189 A1 | 11/2006 | Thompson et al. | |
| 2007/0070808 A1 | 3/2007 | Ray et al. | |
| 2007/0248417 A1 * | 10/2007 | Berg .......................... | 405/158 |
| 2007/0258774 A1 | 11/2007 | Thompson et al. | |
| 2008/0041296 A1 | 2/2008 | Thompson et al. | |
| 2008/0279636 A1 * | 11/2008 | Ray et al. ................... | 405/173 |

FOREIGN PATENT DOCUMENTS

WO  01/73477 A2  10/2001
WO  02/46793 A1  6/2002

OTHER PUBLICATIONS

PCT International Search Report and Written Opinion dated Nov. 19, 2008.

* cited by examiner

*Primary Examiner*—Frederick L Lagman
(74) *Attorney, Agent, or Firm*—Patterson & Sheridan, L.L.P.

(57) ABSTRACT

A method and apparatus for storing, transporting, and transferring one or more sensor devices is described. In one embodiment, the apparatus includes a transfer device having a frame, and a movable platform coupled to the frame. A mesh material may be coupled to the frame and surround at least one side of the movable platform and a mating interface is formed in a side of the frame that is adapted to couple with a remotely operated vehicle in an underwater location.

29 Claims, 7 Drawing Sheets

SEISMIC SENSOR TRANSFER DEVICE

BACKGROUND OF THE INVENTION

1. Field of the Invention

Embodiments described herein relate to the field of seismic exploration. More particularly, to an apparatus and method of transferring seismic equipment to and from an operations platform and an underwater location.

2. Description of the Related Art

Seismic exploration operations in marine environments typically are conducted from the deck of one or more seismic exploration vessels, such as floating platforms or ships. While the fundamental process for detection and recording of seismic reflections is the same on land and in marine environments, marine environments present unique problems due to the body of water overlaying the earth's surface, not the least of which is moving personnel and equipment to a site and maintaining them there for an extended period of time. In this same vein, even simple deployment and retrieval of seismic receiver units in marine environments can be complicated since operations must be conducted from the deck of a seismic exploration vessel where external elements such as wave action, weather, and limited space can greatly affect the operation.

These factors have become even more significant as exploration operations have moved to deeper and deeper water in recent years, where operations require longer periods of offshore time. Seismic exploration in deep water typically uses seismic receiver units that are placed on or near the seabed. These devices are typically referred to as Ocean Bottom Cabling (OBC) or Ocean Bottom Seismometer (OBS) systems, such as Seafloor Seismic Recorders (SSR's). These SSR devices contain seismic sensors and electronics in sealed packages, and record seismic data on-board the units while deployed on the seafloor as opposed to digitizing and transmitting the data to an external recorder. The recorded data is retrieved by retrieving the units from the seafloor. SSR's are typically re-usable and may be recharged and serviced before re-deployment.

In a typical operation, hundreds or thousands of OBS units are deployed in a seismic survey. In one conventional method, the OBS units are deployed using a remotely operated vehicle (ROV) tethered to the operations platform. The ROV may be pre-loaded with OBS units on an on-board storage compartment, and the ROV is lowered below the surface of the water. The ROV is then positioned subsurface and one or more OBS units are removed from the storage compartment and placed on the seafloor. Once all OBS units are removed from the storage compartment, the ROV must be brought to the surface and/or the operations platform for reloading of OBS units. Once reloaded, the ROV is again lowered and the OBS subsurface placement operation is resumed. Likewise, retrieval of OBS units requires transfer of the OBS units from the seafloor to the ROV and, once the storage compartment is full, the ROV must be brought to the surface and/or operations platform for unloading of the OBS units to the operations platform.

The conventional ROV's are typically heavy and require a sophisticated tethering arrangement to control various functions on the ROV. As such, larger vessel cranes operating at low lifting/lowering rates are required for ROV handling. Thus, lifting and lowering the ROV takes time and the lift/lowering time increases proportionally with the depth of the water. Also, heavy seas and/or currents may increase the possibility of damage to the ROV and/or tether each time the ROV is lifted or lowered. Further, potential personnel safety issues are of a concern each time the ROV is lifted and lowered.

Therefore, what is needed is a method and apparatus for transferring OBS units to and from the ROV after the ROV has been deployed in order to minimize the frequency of lifting and lowering the ROV.

SUMMARY OF THE INVENTION

Embodiments described herein relate to an apparatus and method of transferring seismic equipment to and from an operations platform and subsurface location.

In one embodiment, a method of installing a sensor array in a marine environment is described. The method includes deploying a remotely operated vehicle from a vessel, the remotely operated vehicle carrying a first plurality of sensor devices in a storage compartment, placing each of the first plurality of sensor devices in selected locations in the marine environment, deploying a transfer skid from the vessel having a second plurality of sensor devices disposed on a platform integral to the transfer skid, and transferring each of the second plurality of sensor devices from the transfer device to the storage compartment.

In another embodiment, method of installing a plurality of sensor devices in a marine environment is described. The method includes deploying a remotely operated vehicle from an operations platform, the remotely operated vehicle having a portion of the plurality of sensor devices disposed in a storage compartment, placing each of the sensor devices at selected locations on a seabed using the remotely operated vehicle until the storage compartment is depleted, deploying a transfer skid from the operations platform, the transfer skid having a payload comprising another plurality of sensor devices, and transferring the payload to the storage compartment.

In another embodiment, a method of retrieving a plurality of sensor devices from a subsurface location is described. The method includes retrieving a portion of sensor devices from a seabed using a remotely operated vehicle in the subsurface location and placing the each of the retrieved sensor devices in a storage compartment transferring the retrieved sensor devices from the storage compartment to a transfer device in the subsurface location, and lifting the transfer device to a vessel for unloading of the retrieved sensor devices as the remotely operated vehicle retrieves another portion of sensor devices from the seabed.

In another embodiment, a method of installing a plurality of sensor devices in a marine environment is described. The method includes deploying a remotely operated vehicle from an operations platform, the remotely operated vehicle having a portion of the plurality of sensor devices disposed in a storage compartment, placing each of the sensor devices at selected locations on a seabed using the remotely operated vehicle until the storage compartment is depleted, and placing one or more transfer devices at selected locations on the seabed, wherein each of the one or more transfer devices includes another portion of the plurality of sensor devices.

In another embodiment, a transfer skid capable of storing one or more seismic devices is described. The transfer skid includes a movable platform coupled to the frame, and a mating interface formed in a first side of the frame adapted to couple to a guide pin disposed on a remotely operated vehicle.

In another embodiment, a transfer skid capable of storing one or more seismic devices is described. The transfer skid includes a frame having a mesh material forming a basket structure on an upper surface thereof to house the one or more seismic devices, a platform disposed within the basket structure adapted to support the one or more seismic devices, and a mating interface formed in the frame parallel to a base of the basket structure, the mating interface adapted to receive at least one guide pin extending from a remotely operated vehicle.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is also contemplated that elements disclosed in one embodiment may be beneficially utilized on other embodiments without specific recitation.

DETAILED DESCRIPTION

Embodiments described herein relate to an apparatus and method for transferring one or more sensor devices to or from a submerged remotely operated vehicle (ROV) and an operations platform on or above the surface of the water, which may eliminate or minimize many operations typically performed in a conventional exploration operation. The ROV may be any apparatus capable of operating autonomously or semi-autonomously in a marine environment. The sensor devices as described herein may be any discrete or cabled subsurface sensors, for example, seismic sensors and/or seismic recorders, such as ocean bottom seismometers, seafloor seismic recorders, and similar devices.

Figure 1:
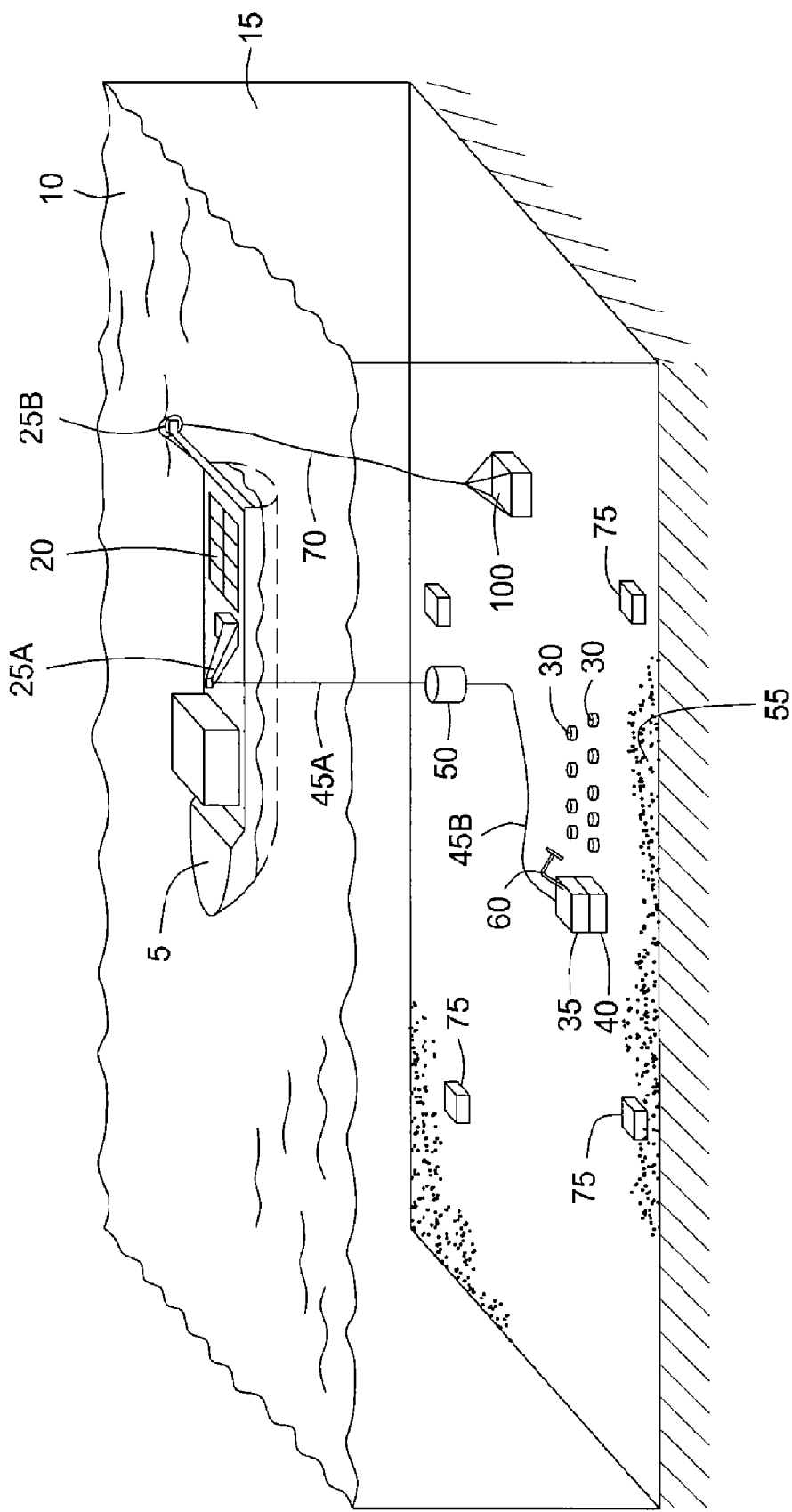
FIG. 1 is an isometric schematic view of one embodiment of a seismic operation in deep water.

FIG. 1 is an isometric schematic view of one embodiment of a seismic operation in deep water facilitated by an operations platform or vessel 5 which is positioned on a surface 10 of a body of water 15. Vessel 5 is provided with a deck 20 from which sensor devices 30 are deployed and retrieved. The deck 20 also includes one or more cranes 25A, 25B attached thereto to facilitate transfer of the seismic operation equipment from the deck 20 to the water 15. For example, crane 25A may be coupled to deck 20 and is configured to lower and raise ROV 35, which transfers and positions one or more sensor devices 30 on a seabed 55. The ROV 35 may be coupled to a tether 45A, 45B configured to provide power, communications, and control to the ROV 35. Optionally or additionally, a tether management system 50 may be used along a length of the tether 45A, 45B. Generally, the tether management system 50 may be utilized as an intermediary, subsurface platform from which to operate the ROV 35. For most ROV 35 operations at or near the seabed 55, the tether management system 50 can be positioned approximately 50 feet above seabed 55 and can pay out tether 45B as needed for ROV 35 to move freely above seabed 55 in order to position and transfer sensor devices 30 thereon.

The vessel 5 may also include crane 25B coupled to a stern of the vessel 5, that is adapted to couple to a transfer device 100 by a cable 70. The transfer device 100 may be a drone, a skid structure, a basket, or any device capable of housing one or more sensor devices 30 therein. The transfer device 100 may be configured as a magazine adapted to house one or more sensor devices 30 for transfer of sensor devices 30 from the vessel 5 to the ROV 35, and from the ROV 35 to the vessel 5. The transfer device 100 may include an on-board power supply, a motor or gearbox, and/or a propulsion system (all not shown). Alternatively, the transfer device 100 may not include any integral power devices and/or not require any external or internal power source. If needed, the cable 70 may provide power and/or control to the transfer device 100. Alternatively, the cable 70 may be a wire, a rope, and the like, that is configured solely for support of the transfer device 100.

The cranes 25A, 25B may be any lifting device and/or launch and recovery system (LARS) adapted to work in a marine environment. As the ROV 35 and storage compartment 40 may weigh about 15,000 lbs. and may be bulkier as compared to the transfer device 100, the crane 25A may be a heavier duty crane. Examples of cranes 25A, 25B include a LARS, a fixed-boom crane, a telescoping boom crane, a knuckle boom crane, and an A-frame crane, having heave compensated winches, constant tension winches, among other vessel cranes, hoists, and/or winches. The crane 25B having the transfer device 100 supported thereon may be operated at higher speeds due to the lighter weight and/or simpler tethering/cabling system as compared to the ROV 35.

The ROV 35 includes a sensor device storage compartment 40 that is configured to store one or more sensor devices 30 therein for a deployment and/or retrieval operation. An example of ROV 35 and storage compartment 40 is described in U.S. Patent Publication No. 2006/0159524, filed Jan. 17, 2005, and published on Jul. 20, 2006, which is incorporated by reference herein. The storage compartment 40 may be a barrel storing the sensor devices, or include a movable platform having the sensor devices thereon. In one embodiment, the sensor devices 30 may be deployed on the seabed 55 and retrieved therefrom by rotation of the movable platform. In another embodiment, the sensor devices 30 may be deployed and retrieved from the storage compartment 40 by a robotic device 60 disposed on the ROV 35. Various apparatus and methods of sensor device deployment are described in U.S. Patent Publication No. 2006/0159524, which was previously incorporated by reference.

For example, in a deployment operation, one or more sensor devices 30 may be loaded into the storage compartment 40 from the vessel 5 and the ROV 35 is lowered to a subsurface position in the water 15. The ROV 35 utilizes commands from the vessel 5 to transfer sensor devices 30 from the storage compartment 40 and deploy individual sensor devices 30 at selected locations on the seabed 55. Once the storage compartment 40 is depleted, the transfer device 100 is used to ferry additional sensor devices 30 as a payload from vessel 5 to the ROV 35. The transfer device 100 may be lowered by crane 25B to a selected depth in the water 15, and the ROV 35 and transfer device 100 are mated. Once mated, the sensor devices 30 contained in the transfer device 100 are transferred to the storage compartment 40. Once storage compartment 40 is reloaded, the ROV 35 and transfer device 100 are detached and sensor device placement by ROV 35 may resume.

In this manner, sensor device placement time, or "planting" time, is significantly reduced as the ROV 35 is not raised and lowered for sensor device reloading. Further, mechanical stresses placed on equipment related to lifting and lowering the ROV 35 are minimized as the ROV 35 may be subsurface for longer periods. The reduced lifting and lowering of the ROV 35 may be particularly advantageous in foul weather and/or rough seas. Thus, safety of personnel and lifetime of equipment may be enhanced as the ROV 35 and related equipment are not raised above surface 10, which may cause the ROV 35 and related equipment to be damaged.

Likewise, in a retrieval operation, the ROV 35 utilizes commands from vessel 5 to retrieve each sensor device 30 that was previously placed on seabed 55, and the retrieved sensor devices are placed into the storage compartment 40. Once the storage compartment 40 is full, the transfer device 100 is used to ferry the retrieved sensor devices 30 as a payload to the vessel 5. The transfer device 100 may be lowered by crane 25B to a selected depth in the water 15, and the ROV 35 and transfer device 100 are mated. Once mated, the sensor devices 30 contained in the storage compartment 40 are transferred to the transfer device 100. Once storage compartment 40 is depleted of retrieved sensor devices, the ROV 35 and transfer device 100 are detached and sensor device retrieval by ROV 35 may resume. In this manner, sensor device retrieval time is significantly reduced as the ROV 35 is not raised and lowered for sensor device unloading. Further, safety issues and mechanical stresses placed on equipment related to the ROV 35 are minimized as the ROV 35 may be subsurface for longer periods.

Figure 2:
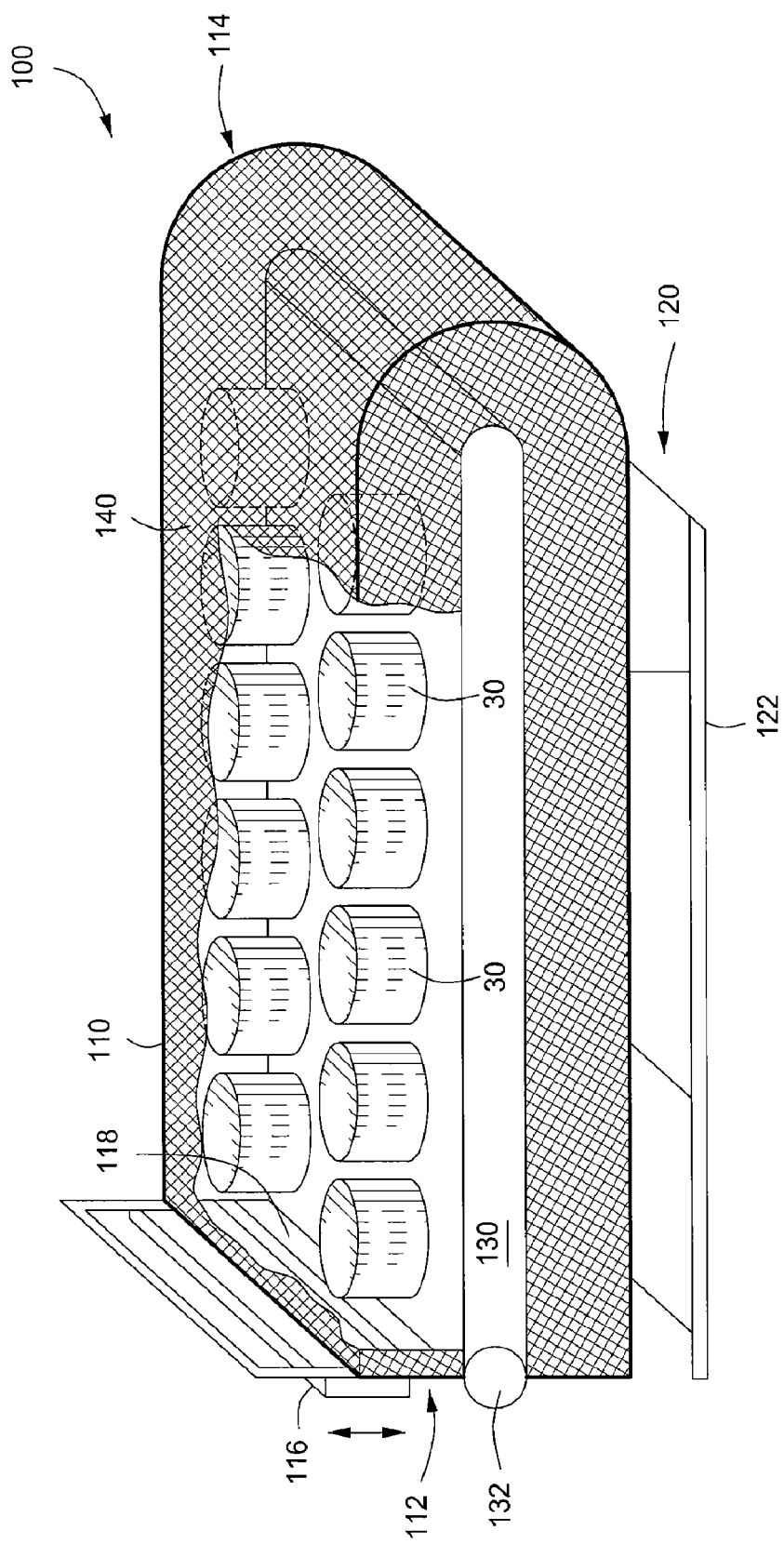
FIG. 2 is an isometric view of one embodiment of a transfer device.

FIG. 2 is an isometric view of one embodiment of a transfer device 100 having a plurality of sensor devices 30 disposed therein. In one embodiment, the transfer device 100 is a basket-type structure having a frame 110 having a first end 112 and an opposing second end 114. The frame 110 may also be coupled to a base 120. One or both of the base 120 and frame 110 supports a platform 130 that is sized to support one or more sensor devices 30 thereon. Although 12 sensor devices 30 are shown, the transfer device 100 may be sized to receive, store, and transfer any number of sensor devices. The frame 120 also includes a base 122 that may be configured as a skid, and may also include vanes to facilitate stabilization of the transfer device 100 during a descent or ascent in the water.

In one application, sensor devices 30 may be loaded from vessel 5 onto the platform 130 and secured thereon for transport to a subsurface location and subsequent transfer to the ROV 35. In one example, a grating or mesh 140 is attached to the frame 110 to secure the sensor devices 30. The frame 110 may be hinged and/or the mesh 140 may include an opening to facilitate transfer of sensor devices to and from platform 130. In one aspect, the first end 112 includes a gate 116 adapted to open and close adjacent an opening 118 in the frame 110. During docking with the ROV 35 in a transfer operation, which will be explained in detail below, the sensor devices 30 may be transferred or unloaded using the robotic device 60 integral to the ROV 35 (FIGS. 3A, 3B).

In one embodiment, the platform 130 is movable relative to the frame 110. The movement of the platform 130 may be linear, circular, or a combination thereof, to facilitate transfer of the sensor devices 30 to or from the storage compartment 40 and transfer device 100. A motor (not shown), such as electrical or hydraulically powered actuator may be coupled to the platform 130 to facilitate this movement. In another embodiment, a portion 132 of the platform 130 may be adapted to contact a movable portion 134 (FIG. 3A) of the storage compartment 40 to facilitate loading and unloading of the sensor devices 30. In this embodiment, at least a portion of the movement of the platform 130 is facilitated by friction.

Figure 3A:
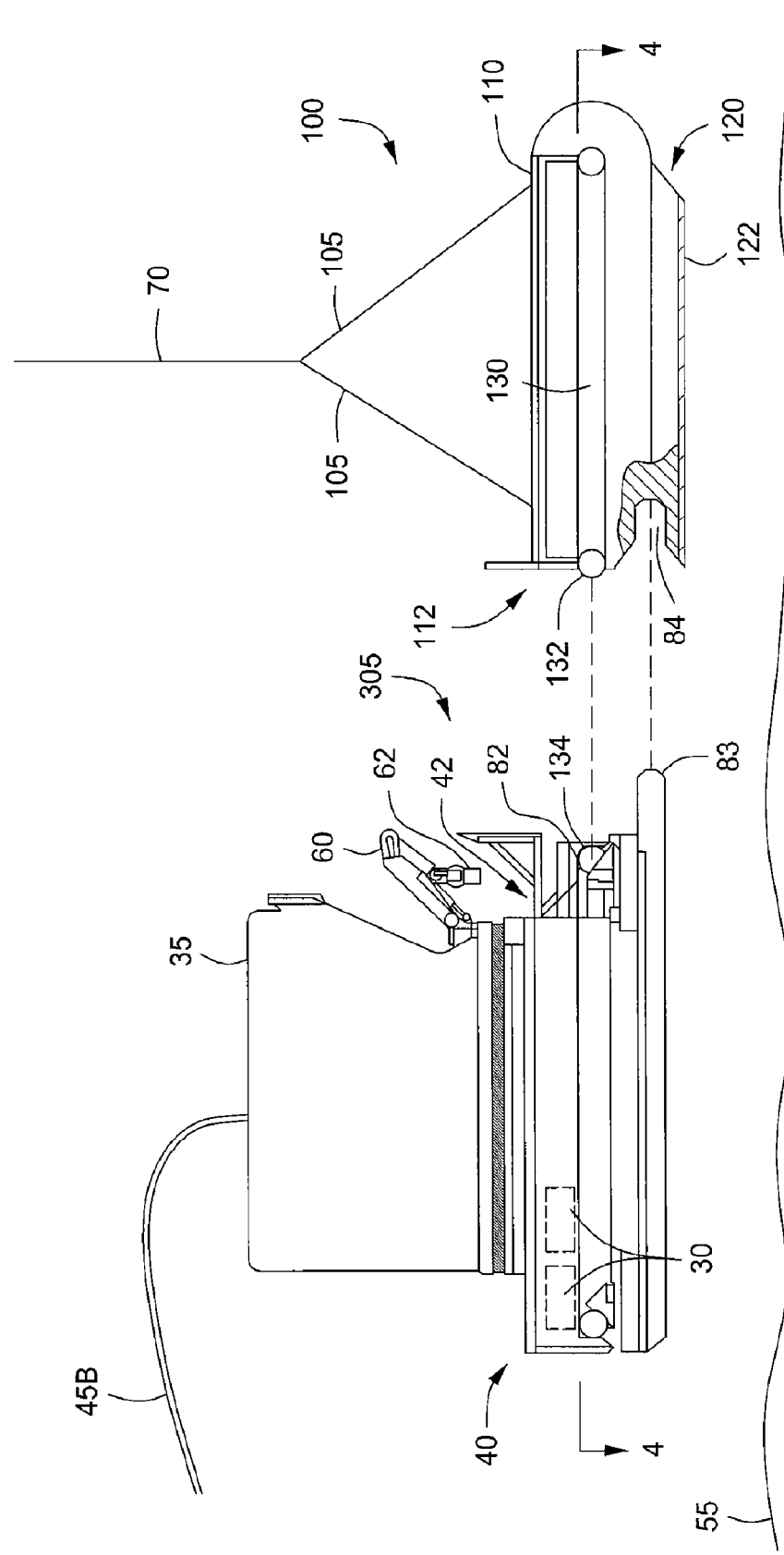
FIG. 3A is a side view of a remotely operated vehicle in an exploded mating position with a transfer device.
Figure 3B:
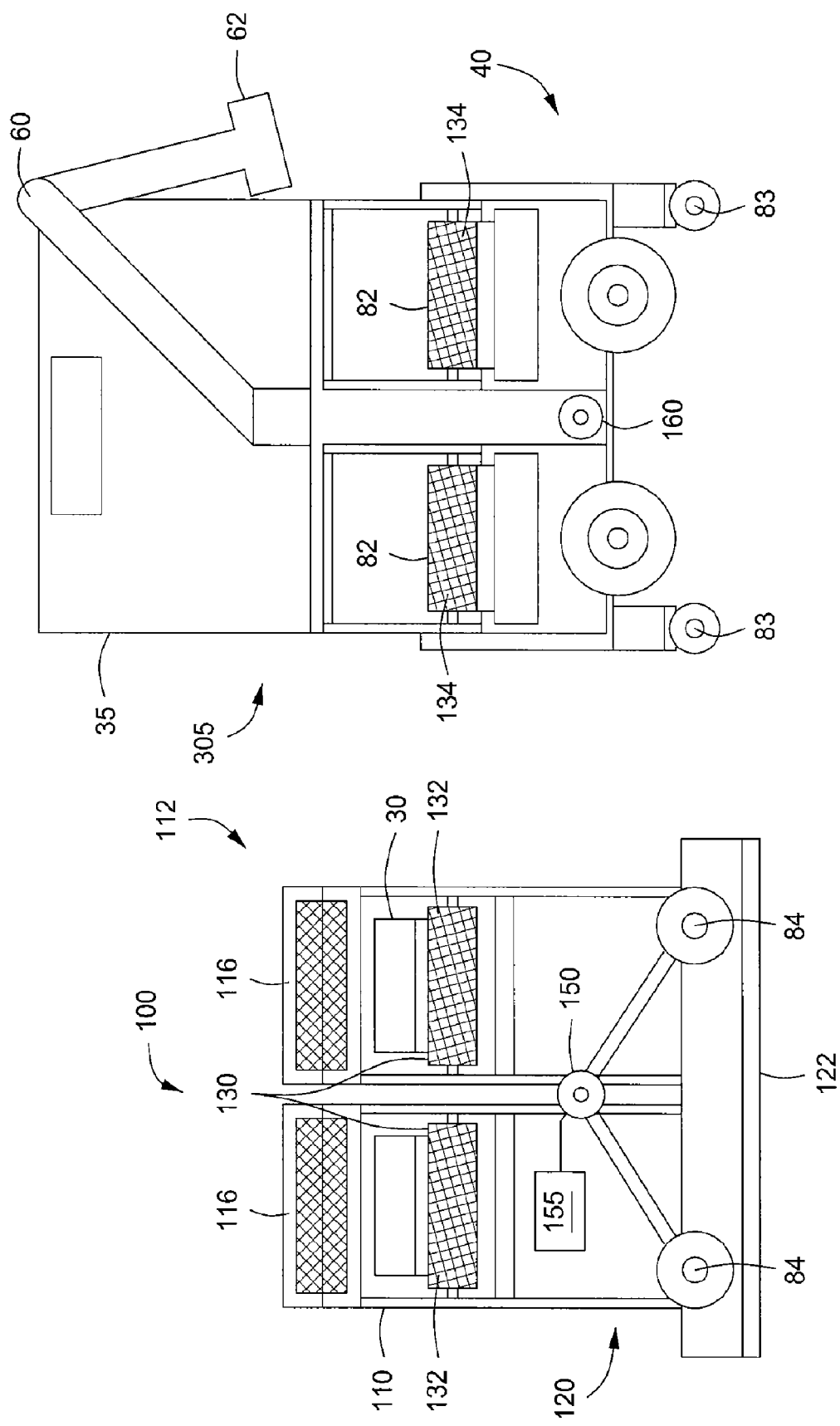
FIG. 3B is an end view of the remotely operated vehicle and the transfer device shown in FIG. 3A.

FIG. 3A is a side view of ROV 35 in an exploded mating position with a transfer device 100. The ROV 35 includes a storage compartment 40 attached thereto, which includes a storage platform 82 configured to support one or more sensor devices 30 (shown in phantom) and facilitate deployment and/or retrieval of the sensor devices 30 to or from the seabed 55. In this embodiment, the first end 112 of the transfer device 100 is adapted to be mated with a first side 305 of the ROV 35 and storage compartment 40. During a transfer operation, the ROV 35 and transfer device 100 are brought together by action by one or both of the ROV 35 and transfer device 100. For example, the transfer device 100 may be suspended from vessel 5 by a cable 70 to a suitable depth and height above the seabed 55. A bridle 105 may attach the cable 70 to the transfer device 100 and may facilitate support and/or orientation of the transfer device 100. The ROV 35, which typically includes propulsion devices, may be actuated toward the transfer device 100 in this position. In other embodiments, the transfer device 100 may be guided or actuated to mate with the ROV 35, which may remain substantially stationary during a mating and/or transfer operation.

In one embodiment, the transfer device 100 is adapted as a replacement storage compartment 40 that may be selectively coupled and decoupled from ROV 35 such that the transfer device 100 functions as the storage compartment 40. In this embodiment, one or both of the ROV 35 and transfer device 100 include a latching system (not shown) configured to temporarily couple the transfer device 100 to a lower portion of ROV 35 so the transfer device 100 may be coupled to ROV 35. In one application referring again to FIG. 1, transfer devices 75, which are similar to transfer device 100, may be deployed from vessel 5 and placed at strategic locations on seabed 55 to await a sensor device transfer procedure or await a coupling with ROV 35 to act as a replacement storage compartment 40.

In one example of a sensor device deployment operation, one or more transfer devices 75, having sensor devices 30 thereon, may be placed on seabed 55 at pre-selected locations within or near the operation zone. Before, during, or after placement of transfer devices 75, ROV 35 and storage compartment 40, having One or more sensor devices 30 may be loaded into the storage compartment 40 from the vessel 5 and the ROV 35 may deploy individual sensor devices 30 at selected locations on the seabed 55. Once the storage compartment 40 is depleted, ROV 35 may discard storage compartment 40 and maneuver to a selected one of the transfer devices 75 previously placed on seabed 55. The ROV 35 may then either mate with the selected transfer device 75 for a sensor device transfer operation, or dock with the selected transfer device 75 in a manner where the transfer device 75 replaces the storage compartment 40. Sensor device placement may then resume by ROV 35 until the selected transfer device 75 is depleted and discarded, and another selected transfer device 75 may then either mate with the selected transfer device 75 for a sensor device transfer operation, or dock with the selected transfer device 75 as a replacement for the previously selected transfer device 75. This operation may continue until the sensor array has been completed without the need to raise ROV 35 from a subsurface location. Discarded storage compartments 40 and transfer devices 75 may be recovered by vessel 5 at any time. A retrieval operation may proceed in a reverse manner, wherein full transfer devices 75 are decoupled from ROV 35 after the sensor devices 30 are retrieved from seabed 55, and empty transfer devices 75 may be coupled to ROV 35 to continue retrieval of sensor devices 30. The full transfer devices 75 may be recovered from seabed 55 before, during, or after the sensor device retrieval operation is complete and returned to the vessel 5.

In one embodiment, a mating interface between the ROV 35 and transfer device 100 is defined by at least one guide pin 83 disposed on one of the ROV 35 and storage compartment 40 frame that is adapted to be received by a mating receptacle 84 disposed on the transfer device 100. The guide pin 83/mating receptacle 84 interface may be provided by any device that facilitates alignment between ROV 35 and storage compartment 40, and transfer device 100. Examples include a male/female interface, wherein, for example, ROV 35 includes a male mating element and the transfer device 100 includes a female mating element. In one embodiment, guide pin 83 is configured as a spear or bayonet, and the mating receptacle 84 is configured as a cone-like aperture that is sized slightly greater than a dimension of the guide pin 83.

In one embodiment, the guide pin 83/mating receptacle 84 interface defines a substantially planar plane during a transfer operation that is defined at least on an upper surface of the platform 82 and platform 130. In this manner, sensor device transfer may be enhanced. In one application, the longitudinal axis of the mating receptacle 84 is substantially parallel to a plane defined by one or both of the platform 130 and base 122. In this manner, the horizontal plane of the storage compartment 40 and transfer device 100 may be substantially planar.

In one embodiment, the storage platform 82 is adapted to move the sensor devices 30 to the first side 305 of the ROV 35, specifically to a load/unload port 42 adjacent a robotic device 60 coupled to the ROV 35. The robotic device 60 includes an end effector 62 adapted to selectively couple to a sensor device 30 and perform other tasks related to seismic operations. The end effector 62 may be a clamp, a suction device, or other articulatable device adapted to grab or hold a sensor device 30 and transfer the device to and from the storage platform 82 and the seabed 55. The end effector 62 may also be adapted to manipulate the transfer device 100 to facilitate docking, securing and unsecuring sensor devices 30, and combinations thereof.

In one embodiment, portion 132 extends slightly beyond the first end 112 of the transfer device 100. In this manner, contact and/or distance between portion 132 and portion 134 is enhanced, which promotes either contact or a small gap between portions 132 and 134 during a transfer procedure.

FIG. 3B is an end view of the ROV 35 and storage compartment 40, and the transfer device 100. In this embodiment, the storage compartment 40 includes two guide pins 83 adapted to mate with two mating receptacles 84 disposed on the transfer device 100. The guide pins 83 and mating receptacles 84 facilitate alignment during a mating procedure between the ROV 35 and transfer device 100. For example, the guide pins 83 are adapted to mate with the mating receptacles 84 to enable a suitable transfer interface of the platforms 82 and 130. In one embodiment, the guide pin 83/mating receptacle 84 interface defines a plane of the platform 82 relative to the platform 130 that is substantially planar. In this manner, sensor device transfer may be enhanced. In another aspect, the guide pins 83 and mating receptacles 84 prevent or minimize twisting and/or a hinge effect between the ROV 35 and transfer device 100 during a mating and transfer procedure. Although not shown, a tip portion of one or both of the guide pins 83 may include a selectively actuatable locking device to facilitate holding the transfer device 100 in a mating position relative to the ROV 35 and storage compartment 40 during a mating and transfer procedure. Alternatively or additionally, the robotic device 60 may provide a clamping or grasping function to hold the transfer device 100 in a mating position relative to ROV 35.

The ROV 35 may also include a power outlet 160 adapted to mate with a power receptacle 150 disposed on the transfer device 100. The power outlet 160 is coupled to a power system (not shown) on the ROV 35 and is adapted to transmit power to the transfer device 100 during a docking and/or transfer procedure. The power outlet may transmit electrical, pneumatic, and/or hydraulic power to the transfer device 100 to facilitate transfer of sensor devices 30. In one embodiment, the power outlet 160 is adapted to mate with the power receptacle 150 on the transfer device 100 to provide power to a motor 155 disposed on the transfer device 100. The motor 155 may be an electric, pneumatic, or hydraulic motor adapted to facilitate transfer of sensor devices 30, such as by facilitating movement of the platform 130. In one application, the power outlet 160 may be a socket or recess disposed on one or both of the ROV 35 and storage compartment 40, and the power receptacle 150 may include one of more pins adapted to be received by the power outlet 160 during a mating procedure. In another application, the power receptacle 150 may be a socket or recess disposed on the transfer device 100, and the power outlet 160 may include one of more pins adapted to be received by the power receptacle 150 during a mating procedure.

Figure 4A:
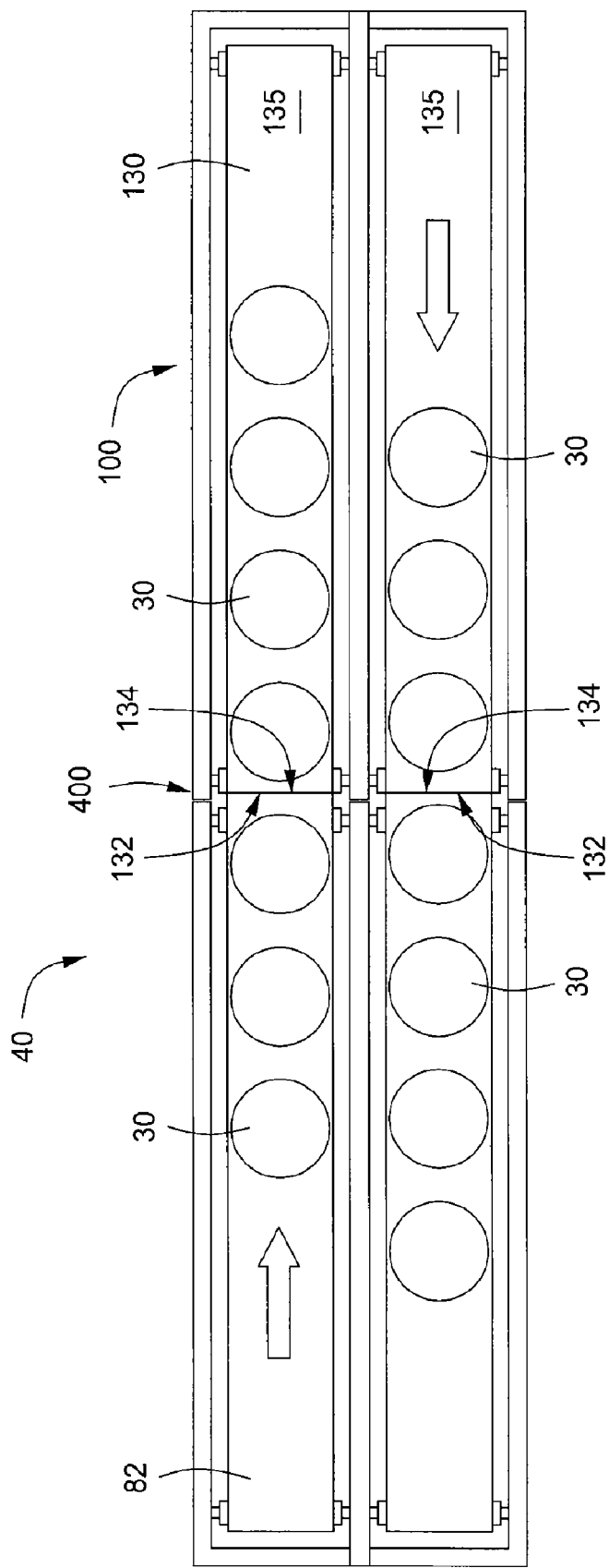
FIG. 4A is a top schematic view of one embodiment of a transfer interface.

FIG. 4A is a top schematic view of one embodiment of a transfer interface 400 between the storage compartment 40 of ROV 35 (not shown) and transfer device 100. In this embodiment, the transfer of sensor devices 30 is substantially linear as the platforms 82, 130 are conveyor belts 135 adapted to transfer the seismic devices 30 along the interface 400 as the ROV 35 and transfer device 100 are mated. The belts 135 may include a low surface area facilitated by a pattern of holes disposed therethrough in order to facilitate water flow and/or decrease drag. While conveyor belt 135 is illustrated as a linear, flexible belt, the conveyor belt 135 may be non-linear, or be replaced by a track or similar mechanism adapted to provide conveyance of a sensor device 30 from a first position to a second position and along interface 400.

The transfer interface 400 is provided during a mating procedure and is at least partially defined by close proximity of the platforms 82, 130, specifically at the portions 132, 134 of the respective platforms 130, 82. In one embodiment, the transfer interface 400 is facilitated by contact between portions 132, 134, while in other embodiments, there may be a slight gap between the portions 132, 134. In either embodiment, a transfer of sensor devices 30 from the transfer device 100 to the storage compartment 40 during a reloading procedure may be performed, or a transfer of sensor devices 30 from the storage compartment 40 to the transfer device 100 in an unloading procedure may be performed.

Figure 4B:
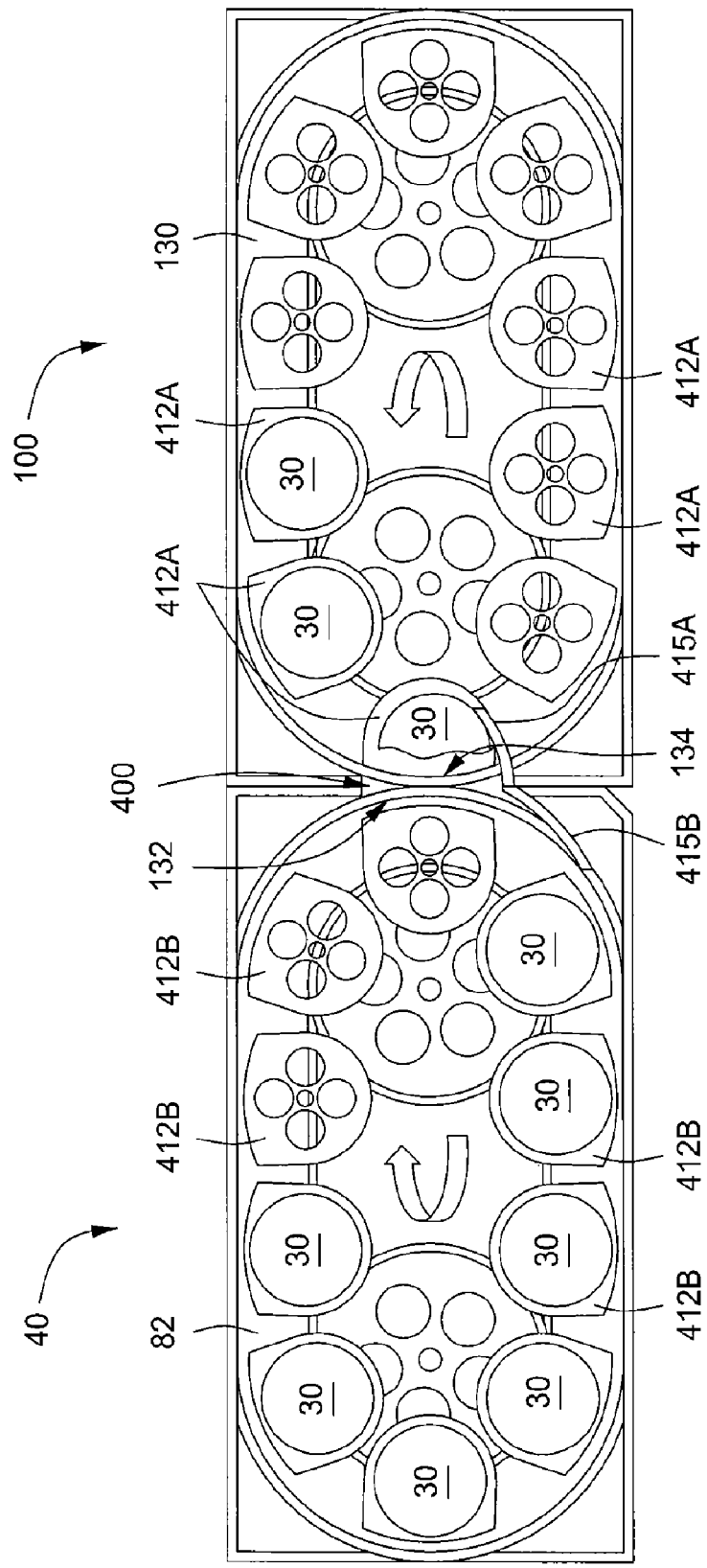
FIG. 4B is a top schematic view of another embodiment of a transfer interface.

FIG. 4B is a top schematic view of another embodiment of a transfer interface 400 between the storage compartment 40 and the transfer device 100. In this embodiment, the transfer of sensor devices 30 is rotational as the platforms 82, 130 are configured as circular or elliptical bodies, or as carousels, which are adapted to transfer the seismic devices 30 along the interface 400 as the ROV 35 (not shown) and transfer device 100 are mated. In this embodiment, the rotational movement may be one of circular, oval, elliptical, and combinations thereof. One or both platforms 82, 130 may include holders 412A, 412B that are rotatably mounted to a carousel mechanism, and the sensor device 30 closest to interface 400 is partially cut away to clearly show interface 400. The transfer interface 400 is provided during a mating procedure and is at least partially defined by close proximity of the platforms 82, 130, specifically at the portions 132, 134 of the respective platforms 130, 82.

Along transfer interface 400, transfer of sensor devices 30 from the transfer device 100 to the storage compartment 40 during a reloading procedure may be performed, or a transfer of sensor devices 30 from the storage compartment 40 to the transfer device 100 in an unloading procedure may be performed. In one embodiment, the transfer interface 400 is facilitated by contact between portions 132, 134, while in other embodiments, there may be a slight gap between portions 132, 134. In one application, platform 82 may be rotated in a first direction, such as clockwise, and platform 130 is rotated in a second direction, such as counterclockwise, and the first direction is opposite to the second direction. This relative rotation between platforms may also be reversed. Transfer of sensor devices 30 may further be facilitated by one or more guides 415A, 415B coupled to one or both of the storage compartment 40 and transfer device 100 during a loading/unloading procedure. For example, when platform 130 is adapted to rotate counterclockwise, guide 415A may act to direct sensor devices across interface 400 onto platform 82. Likewise, guide 415B may be used when platform 82 is caused to rotate clockwise to direct sensor devices 30. Other guides (not shown) may be placed at suitable locations adjacent interface 400 as needed to facilitate transfer of seismic devices.

In one aspect, the transfer interface 400 is rotatable as the platforms 82, 130 are actuated to perform the loading or unloading procedure as shown and described in reference to FIGS. 4A and 4B. In one application, the platforms 82, 130 may be actuated by one or more motors, such as a motor integral to the ROV 35 to move platform 82, which, in turn, moves platform 130 by friction. In another embodiment, the movement of platforms 82, 130 may be independent such that platform 82 moves relative to platform 130, or vice versa. In another embodiment, platform 82 may be actuated by a motor integral to ROV 35 and motor 155 (FIG. 3B) may move platform 130. In one application, motor 155 moves platform 130, which causes movement of platform 82 by frictional forces. In another embodiment (not shown), each of the ROV 35 and transfer device 100 may include a gear system, wherein gear teeth disposed on the ROV 35 and transfer device mesh during a transfer procedure.

Figure 5:
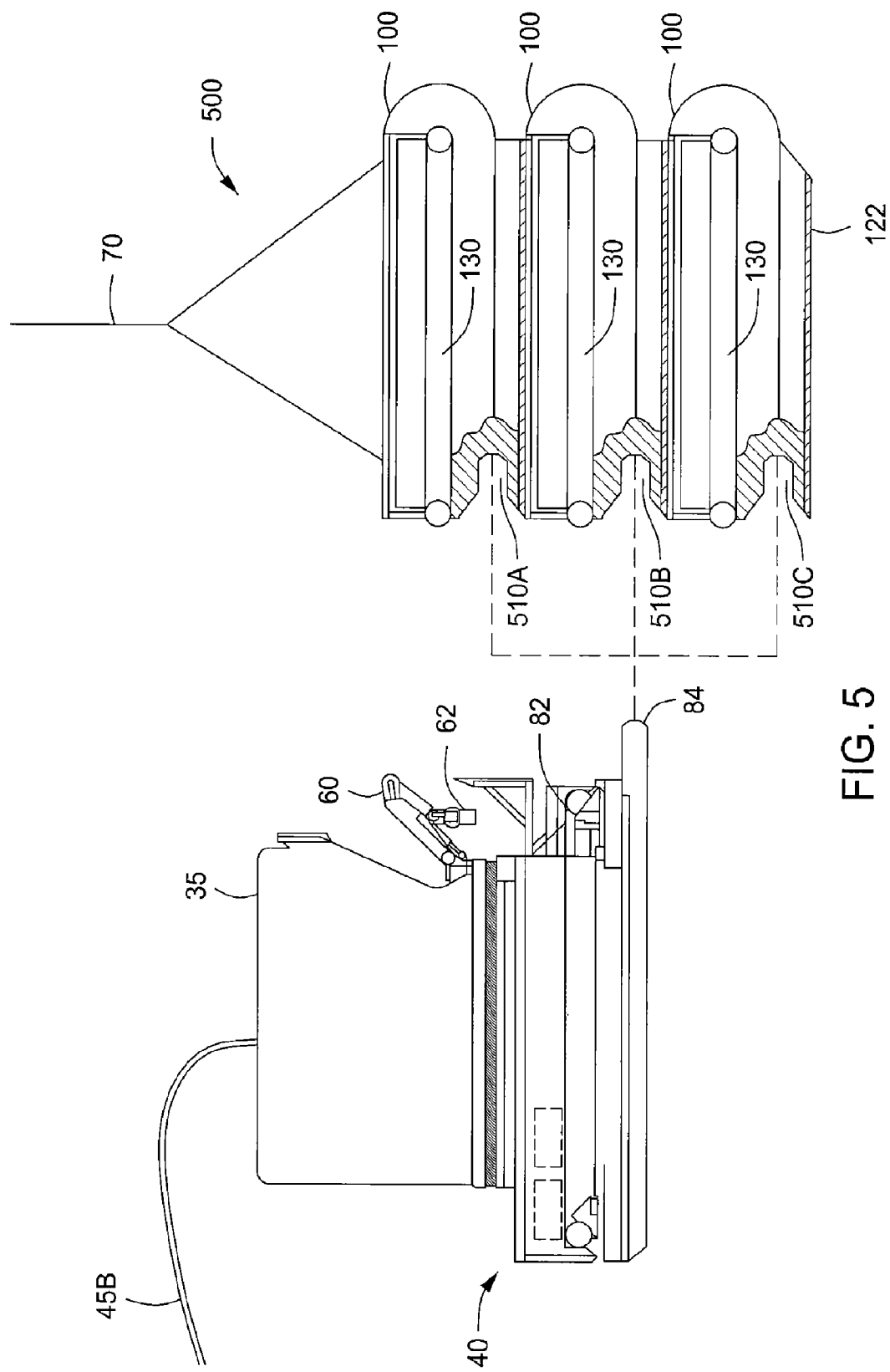
FIG. 5 is a schematic side view of one embodiment of a clustered transfer device.

FIG. 5 is a schematic side view of one embodiment of a clustered transfer device 500. In this embodiment, three transfer devices 100 are stacked and coupled vertically to facilitate a greater storage capacity for sensor devices 30. In this embodiment, a plurality of transfer devices 100 may be deployed to a subsurface location to minimize lifting and lowering of individual transfer devices. Also, the clustered configuration enhances storage of transfer devices and/or sensor devices 30 on deck 20 of vessel 5 (FIG. 1). The clustered transfer device 500 also includes a plurality of mating receptacles 510A–510C configured to provide stability and alignment to ROV 35 during a mating and transfer procedure. In one example, ROV 35 may be positioned to mate with any of the transfer devices 100 by propulsion to a plane to orient the guide pin 84 in the appropriate elevation adjacent a chosen transfer device 100. Once a suitable elevation is achieved, the ROV 35 may be actuated toward the chosen transfer device 100.

Although the clustered transfer device 500 is shown as a vertical stack of transfer devices 100, the transfer devices 100 may be laterally disposed in a side-by-side configuration. Other applications include a lateral and vertical stacking arrangement, such as at least two transfer devices 100 in a side-by-side arrangement each having a transfer device disposed vertically thereon, e.g., four transfer devices. Other stacking/coupling arrangements of transfer devices 100 are also contemplated, and these transfer devices 100 may be pre-loaded with sensor devices 30 and coupled to the deck 20 (FIG. 1) either individually or collectively for transport from a port to a destination.

Embodiments described herein minimize deployment and retrieval time of sensor devices 30 in a seismic operation by minimizing lifting and lowering of ROV 35. Further, mechanical stresses related to lifting and lowering ROV 35 are reduced. This is of particular relevance in foul weather situations where pitching and rolling of a vessel endangers elements related to ROV 35, as well as personnel.

While the foregoing is directed to embodiments of the present invention, other and further embodiments of the invention may be devised without departing from the basic scope thereof, and the scope thereof is determined by the claims that follow.

The invention claimed is:

1. A method of installing a sensor array in a marine environment, comprising:
    deploying a remotely operated vehicle from a vessel, the remotely operated vehicle carrying a first plurality of sensor devices in a storage compartment;
    placing each of the first plurality of sensor devices in selected locations in the marine environment;
    deploying a transfer skid from the vessel having a second plurality of sensor devices disposed on a platform integral to the transfer skid; and
    transferring each of the second plurality of sensor devices from the transfer skid to the storage compartment at a subsurface location.

2. The method of claim 1, wherein the transferring step comprises:
    actuating the platform in one of a linear or circular direction.

3. The method of claim 2, wherein actuation of the platform is accomplished by a motor disposed on the transfer skid.

4. The method of claim 1, wherein the platform includes one or more linear belts.

5. The method of claim 1, wherein the platform comprises a rotating member.

6. A method of installing a plurality of sensor devices in a marine environment, comprising:
    a) deploying a remotely operated vehicle from an operations platform, the remotely operated vehicle having a portion of the plurality of sensor devices disposed in a storage compartment;
    b) placing each of the sensor devices at selected locations on a seabed using the remotely operated vehicle until the storage compartment is depleted;
    c) deploying a transfer skid from the operations platform, the transfer skid having a payload comprising another plurality of sensor devices, and
    d) transferring the payload to the storage compartment at a subsurface location.

7. The method of claim 6, wherein the transferring step includes moving each sensor device with an end effector disposed on the remotely operated vehicle.

8. The method of claim 6, wherein the transfer skid includes a movable platform and the transferring step includes moving the platform in a linear direction.

9. The method of claim 6, wherein the transfer skid includes a movable platform and the transferring step includes rotating the platform.

10. The method of claim 6, further comprising:

e) lifting the transfer skid to the operations platform and reloading the transfer skid with another payload of sensor devices.

11. A method of retrieving a plurality of sensor devices from a subsurface location, comprising:

a) retrieving a portion of the sensor devices from a seabed using a remotely operated vehicle in the subsurface location and placing the each of the retrieved sensor devices in a storage compartment;

b) transferring the retrieved sensor devices from the storage compartment to a transfer skid in the subsurface location; and c) lifting the transfer device to a vessel for unloading of the retrieved sensor devices as the remotely operated vehicle retrieves another portion of the sensor devices from the seabed.

12. The method of claim 11, further comprising:

d) lowering the transfer skid to the subsurface location.

13. The method of claim 11, wherein the transferring step includes moving each sensor device with an end effector disposed on the remotely operated vehicle.

14. The method of claim 11, wherein the transfer skid includes a movable platform and the transferring step includes moving the platform in a linear direction.

15. The method of claim 11, wherein the transfer skid includes a movable platform and the transferring step includes rotating the platform.

16. A method of installing a plurality of sensor devices in a marine environment, comprising:

deploying a remotely operated vehicle from an operations platform, the remotely operated vehicle having a portion of the plurality of sensor devices disposed in a storage compartment;

placing each of the sensor devices at selected locations on a seabed using the remotely operated vehicle until the storage compartment is depleted; and placing one or more transfer skids at selected locations on the seabed, wherein each of the one or more transfer skids includes another portion of the plurality of sensor devices.

17. The method of claim 16, further comprising:

transferring the sensor devices from a selected one of the one or more transfer skids previously placed on said seabed with the remotely operated vehicle.

18. The method of claim 17, wherein the transferring step comprises linear or circular movement of a platform disposed on each of the storage compartment and one or more transfer skids.

19. The method of claim 16, further comprising:

decoupling the storage compartment from the remotely operated vehicle.

20. A transfer skid capable of storing one or more seismic devices, comprising:

a frame;

a movable platform coupled to the frame;

a mating interface formed in a side of the frame that is adapted to couple to a guide pin disposed on a remotely operated vehicle; and a power receptacle disposed on the side of the frame adjacent the mating interface to provide power to a motor disposed on the frame.

21. The apparatus of claim 20, wherein the movable platform comprises a carousel.

22. The apparatus of claim 20, wherein the movable platform comprises a belt.

23. The apparatus of claim 20, wherein the movable platform comprises a plurality of linear belts.

24. The apparatus of claim 20, wherein at least a portion of the frame includes a mesh material covering the one or more seismic devices and the mesh material includes an opening adjacent one end of the movable platform.

25. The apparatus of claim 20, wherein the mating receptacle includes an aperture having a longitudinal axis that is substantially parallel to the plane of the frame.

26. A transfer skid capable of storing one or more seismic devices, comprising:

a frame having a mesh material forming a basket structure on an upper surface thereof to house the one or more seismic devices;

a platform disposed within the basket structure adapted to support the one or more seismic devices; and a mating interface formed in the frame in a parallel orientation to a plane of the base of the basket structure, the mating interface adapted to receive at least one guide pin extending from a remotely operated vehicle.

27. The apparatus of claim 26, wherein the platform is movable and includes a carousel.

28. The apparatus of claim 26, wherein the platform is movable and includes linear belt.

29. The apparatus of claim 26, wherein the frame includes at least two platforms disposed above or below one another.

* * * * *

UNITED STATES PATENT AND TRADEMARK OFFICE
CERTIFICATE OF CORRECTION

PATENT NO. : 7,632,043 B2  Page 1 of 1
APPLICATION NO. : 11/843965
DATED : December 15, 2009
INVENTOR(S) : Thompson et al.

It is certified that error appears in the above-identified patent and that said Letters Patent is hereby corrected as shown below:

In the Assignee (73):
Please delete "Sugal Land" and insert --Sugar Land-- therefor;

In the Claims:
Column 11, Claim 11, Line 15, please delete "device" and insert --skid-- therefor.

Signed and Sealed this

Sixteenth Day of March, 2010

David J. Kappos
*Director of the United States Patent and Trademark Office*